US011280890B2

(12) United States Patent
Ekengren

(10) Patent No.: US 11,280,890 B2
(45) Date of Patent: Mar. 22, 2022

(54) GEODETIC INSTRUMENT WITH IMPROVED DYNAMIC RANGE

(71) Applicant: Trimble AB, Danderyd (SE)

(72) Inventor: Claes Ekengren, Danderyd (SE)

(73) Assignee: Trimble AB, Danderyd (SE)

( * ) Notice: Subject to any disclaimer, the term of this patent is extended or adjusted under 35 U.S.C. 154(b) by 1029 days.

(21) Appl. No.: 15/891,256

(22) Filed: Feb. 7, 2018

(65) Prior Publication Data

US 2018/0164416 A1 Jun. 14, 2018

Related U.S. Application Data

(63) Continuation of application No. PCT/EP2015/072608, filed on Sep. 30, 2015.

(51) Int. Cl.
| | | |
|---|---|---|
| *G01C 3/08* | (2006.01) | |
| *G01S 7/486* | (2020.01) | |
| *G01S 17/10* | (2020.01) | |
| *G01S 7/4861* | (2020.01) | |
| *G01S 7/4865* | (2020.01) | |
| *G01S 7/497* | (2006.01) | |
| *G01S 17/42* | (2006.01) | |

(52) U.S. Cl.
CPC .......... *G01S 7/4868* (2013.01); *G01S 7/4861* (2013.01); *G01S 7/4865* (2013.01); *G01S 7/497* (2013.01); *G01S 17/10* (2013.01); *G01S 17/42* (2013.01)

(58) Field of Classification Search
CPC ...... G01S 7/4868; G01S 17/10; G01S 7/4861; G01S 7/4865; G01S 7/497; G01S 17/42
See application file for complete search history.

(56) References Cited

U.S. PATENT DOCUMENTS

| 3,644,740 A | 2/1972 | Dobratz et al. |
|---|---|---|
| 4,271,503 A | 6/1981 | Eumurian et al. |
| | (Continued) | |

FOREIGN PATENT DOCUMENTS

| CN | 1682292 A | 10/2005 |
|---|---|---|
| CN | 101158572 A | 4/2008 |
| | (Continued) | |

OTHER PUBLICATIONS

International Search Report and Written Opinion for Application No. PCT/EP2015/072608 dated Jun. 24, 2016, 12 pages.

(Continued)

*Primary Examiner* — Daniel L Murphy
(74) *Attorney, Agent, or Firm* — Kilpatrick Townsend & Stockton LLP

(57) ABSTRACT

A method for determining a distance to a target by a geodetic instrument is disclosed. The method comprises emitting an optical pulse towards a target at an emission time, applying a bias adjustment to a photodiode that is arranged to receive a return optical pulse reflected at the target, obtaining a reference signal that is indicative of a transient behavior of the photodiode for the bias adjustment, obtaining a difference signal by subtracting, from a signal output from the photodiode, a signal that resembles, or is equal to, the transient behavior of the photodiode in response to the bias adjustment based on the reference signal, extracting a reception time that corresponds to reception of the return optical pulse at the photodiode based at least in part on the difference signal, and determining the distance to the target based on the emission time and the reception time.

20 Claims, 5 Drawing Sheets

(56) References Cited

U.S. PATENT DOCUMENTS

| | | | |
|---|---|---|---|
| 4,464,048 A | | 8/1984 | Farlow |
| 5,469,057 A | | 11/1995 | Robinson |
| 9,304,203 B1 | * | 4/2016 | Droz .................. G01S 7/486 |
| 2010/0079322 A1 | | 4/2010 | Gladshtein et al. |
| 2011/0240865 A1 | * | 10/2011 | Frach .................. G01T 1/2018 |
| | | | 250/362 |
| 2014/0300887 A1 | * | 10/2014 | Yamamoto ............. G01S 7/497 |
| | | | 356/5.01 |

FOREIGN PATENT DOCUMENTS

| | | |
|---|---|---|
| CN | 101360346 A | 2/2009 |
| CN | 101387658 A | 3/2009 |
| CN | 101655563 A | 2/2010 |
| CN | 103105612 A | 5/2013 |
| CN | 103308921 A | 9/2013 |
| CN | 103905113 A | 7/2014 |
| CN | 204578469 U | 8/2015 |
| KR | 10-2015-0017503 A | 2/2015 |
| WO | 03/081782 A1 | 10/2003 |
| WO | 2015/088714 A1 | 6/2015 |

OTHER PUBLICATIONS

Tomita et al., "A balanced gated-mode photon detector for qubit discrimination in 1550 nm," ARXIV. Org., Cornell University Library, 201 Olin Library Cornell University Ithaca, NY, Jun. 21, 2002, downloaded Feb. 7, 2018, 6 pages.

* cited by examiner

GEODETIC INSTRUMENT WITH IMPROVED DYNAMIC RANGE

CROSS-REFERENCE TO RELATED APPLICATIONS

This application is a continuation of International Application No. PCT/EP2015/072608, filed Sep. 30, 2015, the entire contents of which are incorporated herein by reference in their entirety for all purposes.

TECHNICAL FIELD

The present disclosure generally relates to the field of surveying. In particular, the present disclosure relates to geodetic instruments and methods of operating such geodetic instruments in order to determine a distance to a target.

BACKGROUND

In the art of surveying, the positions of objects are determined by measuring angles and distances. For this purpose, a surveying or geodetic instrument includes an electronic distance measuring device (EDM) that may use different techniques to estimate a distance between the EDM itself and a target object. One such technique is the so called "time-of-flight" method, wherein the distance to a target object is estimated by measuring the round-trip of an optical pulse of light. Using an optical source, such as a laser, an optical pulse is emitted towards the target with the hope that at least some part of the pulse will be reflected at the target and return back to the measuring device, from which the pulse was emitted, where the pulse is then detected by a photodetector. If the time it takes for the optical pulse to travel to and back from the target object is accurately measured, a good estimate of the distance to the target object may be calculated.

If optical pulses are emitted in several directions, the distances to several points on an object may be determined. If the angle of emission for each pulse is well controlled (either by rotating the EDM or the geodetic instrument itself, or by e.g. using mirrors to deflect the emitted optical pulses in known directions), a mapping between distances and emission angles may be created and used in order to build a three-dimensional map of the surface of the object. In this way, the geodetic instrument may function as a three-dimensional (3D) scanner.

In order to rapidly scan the surface of an object, modern 3D-scanners perform in the order of several thousand distance measurements every second. If the difference in optical properties (such as reflectivity) between two nearby points (or regions) on the target object is large, the two respective returned (reflected) optical pulses may differ greatly in terms of e.g. magnitude. As a consequence, the receiving end of the EDM is required to have a high dynamic range in order for it to be able to detect incoming optical pulses of varying characteristics.

In light of the above, a challenge in the present disclosure is therefore to provide a geodetic instrument with an improved dynamic range.

SUMMARY

An object of the present disclosure is therefore to at least partially fulfill the requirements specified above. To achieve this, a method and a geodetic instrument are provided. The features of the method and the geodetic scanner are defined in the independent claims, while further embodiments of the present disclosure are defined in the dependent claims.

Within a first aspect, a method for determining a distance to a target by a geodetic instrument is provided. In the method, an optical pulse is emitted towards the target at an emission time, and a bias adjustment is applied to a photodiode. The photodiode is arranged to receive a return optical pulse reflected at the target. A reference signal that is indicative of a transient behavior of the photodiode for the bias adjustment is obtained. A difference signal is obtained by subtracting, from a signal output from the photodiode (e.g. in response to the return optical pulse), a signal resembling, or equal to, the transient behavior of the photodiode in response to the bias adjustment based on the reference signal. Based at least in part on the difference signal, a reception time that corresponds to reception of the return optical pulse is extracted, and the distance to the target is determined based on the emission time and the reception time.

Within a second aspect, a geodetic instrument is provided. The geodetic instrument includes an optical source, a photodiode, a bias regulation unit, a compensation unit and a processing unit. The optical source is arranged to emit an optical pulse towards a target at an emission time. The photodiode is arranged to receive a return optical pulse that is reflected at the target. The bias regulation unit is configured to perform an adjustment of a bias supplied to the photodiode. The compensation unit is configured to obtain a reference signal that is indicative of the transient behavior of the photodiode for the bias adjustment. The compensation unit is configured to obtain a difference signal by subtracting, from a signal output from the photodiode (e.g. in response to the return optical pulse), a signal resembling, or being equal to, the transient behavior of the photodiode in response to the bias adjustment based on the reference signal. The processing unit is configured to extract, based at least in part on the difference signal, a reception time that corresponds to reception of the return optical pulse, and to determine a distance to the target based on the emission time and the reception time.

The method of the first aspect and the geodetic instrument of the second aspect may provide for a measurement of a distance to a target. In particular, when used e.g. for 3D-scanning of an object, the method and the instrument allow for an increased number of distance measurements to be performed during a shorter period of time due to an improved adjustability of the dynamic range of the photodiode (or more generally a photodetector) without a major degradation of signal-to-noise ratio. When measuring a distance to a target by estimating the time it takes for an optical pulse to travel to the target and back, a chain of different steps may normally be performed. Starting with e.g. the step of emission of the optical pulse towards the target, the final steps may normally involve detecting the pulse when it returns back from the target, and estimating the elapsed time since emission in order to calculate the distance. Due to the physical nature of both optics and electronics, noise may be introduced during each step. In the present embodiments, amplification of a signal may be performed early in the chain of steps and less noise may have had time to accumulate in the signal as compared to later in the chain of steps. As a result, less noise may be amplified, and an improved signal-to-noise ratio may be achieved. By controlling the dynamic range of the photodiode by adjusting its applied bias, suitable amplification (or modification) of the signal that corresponds to an incoming optical pulse may be introduced early in the chain.

When quickly adjusting the applied bias of a photodiode (as will likely be necessary if several thousand measurements are to be performed every second, in line with the requirement of modern 3D-scanners), the photodiode may experience a transient behavior in which a change of applied bias causes e.g. transient spikes to appear in its output signal, independent of whether an incoming optical pulse is present or not. This behavior may be attributed to e.g. an internal capacitance of the photodiode. If the transient spikes are large enough to partially or completely mask out a signature of an incoming optical pulse in the signal, or if the transient spikes are themselves interpreted as signatures of incoming optical pulses, an accurate detection of an optical pulse and a consequent determination of the time of reception may be hard or even impossible to perform. As a result, a distance measurement may be erroneous and unreliable.

In the method of the first aspect and the instrument of the second aspect, the occurrence of transient spikes is solved, or at least partly attenuated, by subtracting, from the signal output from the photodiode, a signal that resembles, or is equal to, the transient behavior of the photodiode. As a result, the signature of an eventual incoming optical pulse detected at the photodiode may be the dominant signature in the difference signal. Based at least in part on the difference signal, a reception time that corresponds to the reception of the optical pulse may be extracted and also, in combination with the time of emission of the optical pulse from the optical source, the distance to the target may be determined based on the emission time and the reception time, even after the bias of the photodiode was quickly adjusted in order to change the dynamic range.

According to one embodiment, the reference signal may be obtained from a reference electronic component that is arranged such that its signal output is unaffected by the return optical pulse and subject to a bias adjustment (performed e.g. by a bias regulation unit) related to (or based on) the bias adjustment applied to the photodiode. The reference electronic component may be included in the geodetic instrument, or provided separately or as part of another device in contact with the geodetic instrument. As the signal output from the reference electronic component is unaffected by the incoming pulse (i.e. the reflected optical pulse or return optical pulse), the reference electronic component may, when subject to the bias adjustment related to (or based on) the bias adjustment applied to the photodiode, generate a signal response that may only contain e.g. a transient spike and no signature of the reflected optical pulse.

In some embodiments, the reference electronic component may have a transient behavior that resembles, or is equal to, that of the photodiode. The reference electronic component may also have a transient behavior that has a known deviation from that of the photodiode.

If the transient behavior is resembling of, or equal to, that of the photodiode, the reference electronic component may generate a reference signal that may be directly used when obtaining the difference signal. If the transient behavior of the photodiode and the reference electronic component is the same when subject to the same bias adjustment, a bias regulation unit may be configured such that the same bias is supplied to both components, and the same adjustment of the supplied bias is performed.

If the transient behavior has a known deviation from that of the photodiode, this known deviation may be compensated for when obtaining the difference signal in e.g. a compensation unit included in the geodetic instrument. As an example, a photodiode and a reference electronic component may have transient behaviors that are proportional but different in magnitude when the two components are supplied with the same bias. The same biases may then still be supplied (by e.g. a bias regulation unit), but the known difference or deviation in transient behavior may be compensated for when obtaining the difference signal and/or the reference signal, e.g. in a processing unit.

In some embodiments, a difference in transient behavior between the photodiode and the reference electronic component may be compensated for by supplying different biases (i.e. by applying different bias adjustments) to the photodiode and the reference electronic component, in such a way that the signature of an eventual incoming optical pulse detected at the photodiode will still be dominantly present in the difference signal. As an example, a photodiode and a reference electronic component may show the same transient behavior only if the bias adjustment applied to the reference electronic component is proportional to but smaller or larger in magnitude than that of the bias adjustment for the photodiode. By supplying different biases (from e.g. a bias regulation unit), a difference signal may still be obtained.

In some embodiments, it may also be envisaged that unknown differences in transient behavior or signal output between the photodiode and the reference electronic component may be analyzed during operation of the geodetic instrument, and that the differences may still be compensated for when the difference signal is extracted (such as in e.g. the compensation unit) by using the differences and by performing the bias adjustments accordingly.

According to an embodiment, the reference signal may be obtained based on calibration data from a calibration of the photodiode. Such calibration data, representative of the transient behavior of the photodiode for the bias adjustment, may be obtained at the factory by subjecting the photodiode to different bias adjustments and studying the resulting transient behaviors. It may also be envisaged that such a calibration may be performed by the geodetic instrument itself, out in the field before, during or after a measurement operation.

The calibration data obtained during a calibration may be stored, e.g. in a memory included in or otherwise communicated with (or accessible by) the geodetic instrument, and later used to obtain the reference signal in order to compensate for the transient behavior of the photodiode, such that the signature of a return optical pulse may more properly be detected. It will be appreciated that the calibration data may be used alone, or in combination with e.g. a reference electronic component, when obtaining the reference signal.

According to one embodiment, the bias may be adjusted (and supplied to the photodiode, e.g. by a bias regulation unit) based at least in part on a signal level of a previously received return optical pulse. If for example two pulses are emitted towards more or less the same target (or the same point or nearby points on a target), it may be expected that the surface they hit will have approximately the same optical reflecting properties. Thus, the magnitude of the returned pulses that have been reflected at the target may be expected to be in the same range. If the magnitude of the signature of the first pulse is a bit low, the bias (and thereby the internal gain) of the photodiode may be adjusted such that the second returned pulse may give rise to a larger signature. Likewise, if e.g. several in a series of recent pulses have generated signatures with the same order of magnitude, chances may be higher that also one or more of the next couple of pulses will be similar in magnitude, and the gain may then be only slightly adjusted. Adjusting the gain based at least in part on a signal level of a previously returned optical pulse, the geodetic instrument and a method implemented therein may achieve a predictive gain setting that may be applied to the photodiode, increasing both the speed and the accuracy in outcomes of a series of distance measurements.

According to one embodiment, the bias may be adjusted (and supplied to the photodiode, e.g. by a bias regulation unit) before, concurrently with or at least close to emission of the pulse towards the target. By performing the bias adjustment immediately before, after, or concurrently with, the emission of the optical pulse, a transient behavior caused by a rapid change of bias will have more time to diminish before the incoming reflected optical pulse is received at the photodiode.

According to one embodiment, the bias may be adjusted (and supplied to the photodiode, e.g. by a bias regulation unit) before the return optical pulse is received by the photodiode. Adjusting the bias before the return of the optical pulse ensures that the photodiode may be optimized such that its internal gain is suitable for the expected magnitude of the incoming optical pulse.

According to one embodiment, the bias may be adjusted (and supplied to the photodiode, e.g. by a bias regulation unit) before the emission of a next optical pulse based at least in part on the difference signal. If, for example, no or little signature of a previously expected return optical pulse is detected in the difference signal, the bias may be adjusted such that the gain of the photodiode is such that the next emitted (and reflected) optical pulse has a higher probability of being detected. Likewise, the bias may be adjusted if the gain of the photodiode was such that the detection of the previously expected return optical pulse was saturated or otherwise made impossible. The adjustment of the bias may also be performed concurrently with, or after, the emission of the next optical pulse, based at least in part on the difference signal.

It will be appreciated that the return optical pulse may correspond to the part of the optical pulse that is emitted at the emission time and reflected at the target. This will introduce less uncertainty in the distance determining process since an incoming pulse originating from e.g. another optical source may not necessarily be detected as such by the photodiode. In order to differentiate between pulses emitted by the optical source and another optical source, it may be anticipated that pulses with specific characteristics (in terms of e.g. frequency, magnitude, polarization and phase) are emitted by the optical source, and also that these characteristics change between two emitted pulses in order to differentiate between pulses emitted at different emission times.

According to one embodiment, the emission time may be based at least in part on a previously extracted reception time. If a previous reception time is known, the next optical pulse may, if desired, be emitted shortly thereafter in order to increase the rate of measurements. Instead of emitting pulses at a fixed rate, the rate may in this way be adapted to depend on the currently expected distance between the optical source and the target (or point thereon) towards which the optical source is currently arranged to emit optical pulses. If the expected distance, determined based in part on the previous reception time, is short, pulses may be emitted at a higher rate. If the expected distance is longer, the rate of emission may be reduced.

According to an embodiment, the reception time may be extracted (e.g. by a processing unit) after a measurement time interval has elapsed after the emission time (e.g. the time when an optical pulse was emitted). As an example, since it inherently takes some time for the optical pulse to reach the target and to arrive back at the photodiode, it may be suitable to wait a certain measurement time after the emission of the optical pulse towards the target before starting to check if an optical pulse has been returned back to the photodiode. Other steps may then be performed while waiting for the measurement time interval to elapse, and power resources in the geodetic instrument may then be available for other purposes during this interval. Likewise, if no optical pulse is detected within another measurement time interval (in case the emitted pulse e.g. happened not to reach the target, or if the pulse got lost on its way back from the target), continuing to check for the return optical pulse for longer than the elapse of the another measurement time interval may not be required, and the method and instrument may instead proceed with other steps, such as for example aborting the current distance measurement and instead initiate a new one.

According to one embodiment, the measurement time interval may be based at least in part on a previously extracted reception time. It may, for example, be expected that the return-trip of two consecutive pulses will travel for about the same time, if they are emitted in approximately the same direction and thereby reflected at approximately the same target (or approximately the same point or nearby points on a target). As such, the reception time of a first optical pulse may give an indication of the duration of the measurement time interval, and an indication about when a next pulse may be expected to return.

According to one embodiment, the photodiode may be an avalanche photodiode. Avalanche photodiodes may be more highly sensitive, and may provide a built in stage of gain that relies on avalanche multiplication. This may reduce the need of external (outside of the photodiode itself) amplifiers, and may allow for control of the gain by adjustment of the bias applied to the photodiode. Preferably, the avalanche photodiode may be biased with a reverse-voltage. In addition to avalanche photodiodes, other alternatives may be envisaged such as for example semiconductor phototransistors or other photodiodes.

More generally, in the present embodiments of this disclosure, the photodiode may also be referred to as a photodetector which may be subject to a transient behavior upon adjustment of a bias applied to it. The photodetector may include a capacitive element and its output signal may depend on light impinging on its surface for detection of an optical light pulse.

According to one embodiment, the bias of the photodiode may be adjusted in a linear mode (by e.g. a bias regulation unit), such that the magnitude of the applied bias does not exceed the breakdown voltage of the photodiode. If e.g. the photodiode is an avalanche photodiode, an incoming optical pulse may only trigger a limited, self-quenching avalanche response and no additional quenching-circuits is needed. Using a linear mode of operation, the photodiode may be less sensitive to dark currents.

According to one embodiment, the reference electronic component may be optically shielded from the return optical pulse. In other words, the reference electronic component may be arranged such that it is not optically exposed to the return optical pulse. The reference electronic component may for instance be encapsulated in a box or placed remote from the line of sight (or measurement path) of the geodetic instrument. To optically shield the reference electronic component may serve as a way of making its signal output unaffected to the return optical pulse.

According to one embodiment, the reference electronic component may include a photodiode, a capacitor, or a solid state device having a capacitive element. A capacitive element may have a transient behavior in response to a bias adjustment, and a signal output from the reference electronic component may correspond to this transient behavior.

According to one embodiment, the reference electronic component may have the same or a similar capacitive dependency on applied bias as the photodiode.

For example, a photodiode that may be included in the reference electronic component may have a transient behavior resembling to that of, or equal to, the other photodiode. Two photodiodes that have approximately the same transient response or behavior, may respond in the same way when supplied with the same bias, and since the photodiode included in the reference electronic component may be optically shielded from (or unexposed to) the return optical pulse, the output signal from the photodiode may only contain e.g. the transient peaks discussed above. The transient peaks may then be eliminated, or at least reduced, in the extracted difference signal by subtracting the signal output of the photodiode by the signal output of the photodiode included in the reference electronic component. Instead of using a second photodiode, another capacitive element (such as a capacitor or a capacitive element included in a solid state device) having a capacitance equal to that of the photodiode, in order to have a similar transient behavior, may be used in some other embodiments.

In some embodiments, the photodiode included in the reference electronic component may be identical to the "detecting" photodiode. If the two photodiodes are different, different biases may be supplied and different bias adjustments may be performed to compensate for different transient behaviors.

It may also be envisaged that the reference electronic component may have a deviating, but known, capacitive dependency on applied bias.

A known capacitive dependency on a bias adjustment may be directly inferred from a known capacitive dependency on applied bias, or from a known deviation in capacitive dependency on applied bias.

According to one embodiment, the compensation unit may include a differential amplifier. The differential amplifier may be configured to receive two signals as its input, and to output a signal proportional to the difference of the two input signals, thereby resulting in the difference signal. Instead of a differential amplifier, other devices which are capable of producing an output proportional to the difference of two input signals may be envisaged, such as certain inductor or transformer configurations, or other devices able to reject or at least partly suppress a common-mode signal.

It may also be envisaged that the reference signal is inverted (e.g. by the reference electronic component itself, or due to some other circuit element and/or operation acting on the reference signal before it reaches the compensation unit). In such a case, the compensation unit may compensate for this inversion before obtaining the difference signal, e.g. by inverting the reference signal again or by performing an addition (instead of a subtraction) when obtaining the difference signal based on the reference signal and a signal output from the photodiode. It is further envisaged that the compensation unit may be configured to compensate for any performed modification of the signals input to it (such as e.g. inversion, rescaling, shift in time or frequency, or combinations thereof), before, during or after obtaining the difference signal.

The present disclosure relates to all possible combinations of features recited in the claims. Further, any embodiment described herein may be combinable with other embodiments also described herein, and the present disclosure relates to all combinations of features even if said features are recited in mutually different claims. The steps of any method disclosed herein do not have to be performed in the exact order disclosed, unless explicitly stated, and features referring to the method of the first aspect may be combinable with features referring to the geodetic instrument of the second aspect, and vice versa.

Further objects and advantages of the various embodiments of the present disclosure will be described below by means of exemplifying embodiments.

DRAWINGS

Exemplifying embodiments will now be described in more detail, with reference to the accompanying drawings in which:

FIG. 1 schematically illustrates a timing sequence of signals involved in a measuring procedure of a geodetic instrument according to some embodiments;

Unless explicitly stated to the contrary, the drawings show only such elements that are necessary to illustrate the example embodiments, while other elements, in the interest of clarity, may be omitted or merely suggested.

DETAILED DESCRIPTION

The present disclosure will now be described more fully hereinafter with reference to the accompanying drawings, in which exemplifying embodiments are shown. The invention may however be embodied in many different forms and should not be construed as limited to the embodiments set forth herein, and these embodiments are rather provided by way of examples.

Figure 1:
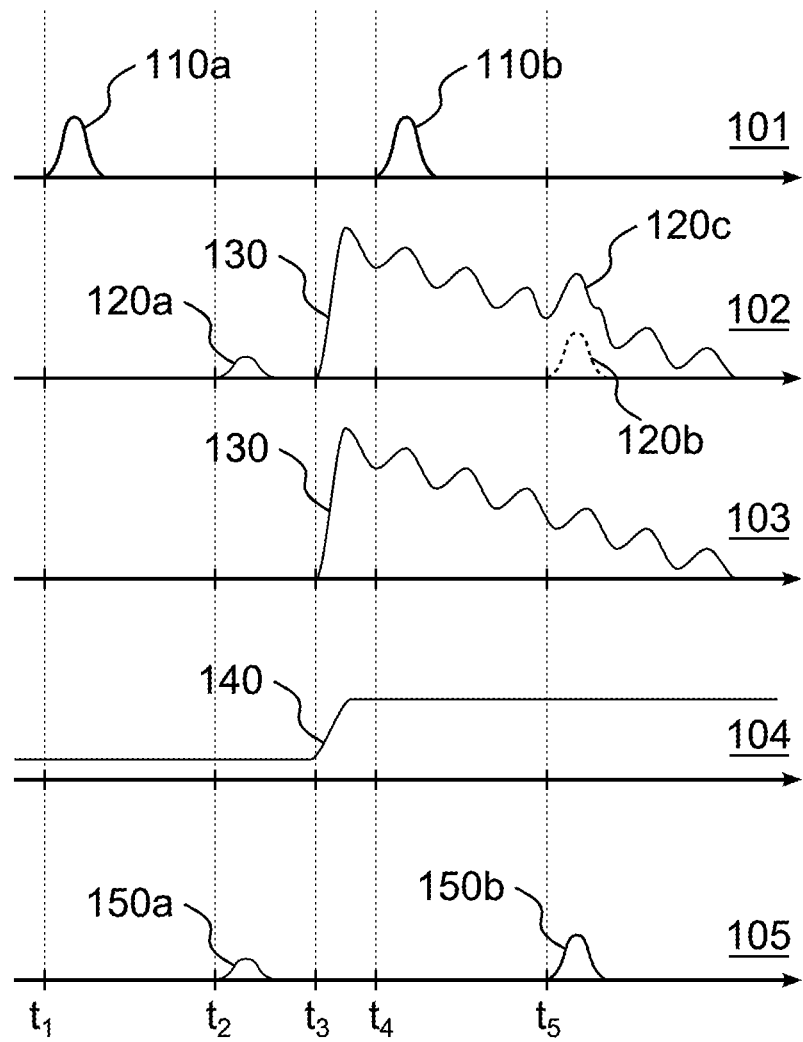
Figure 2:
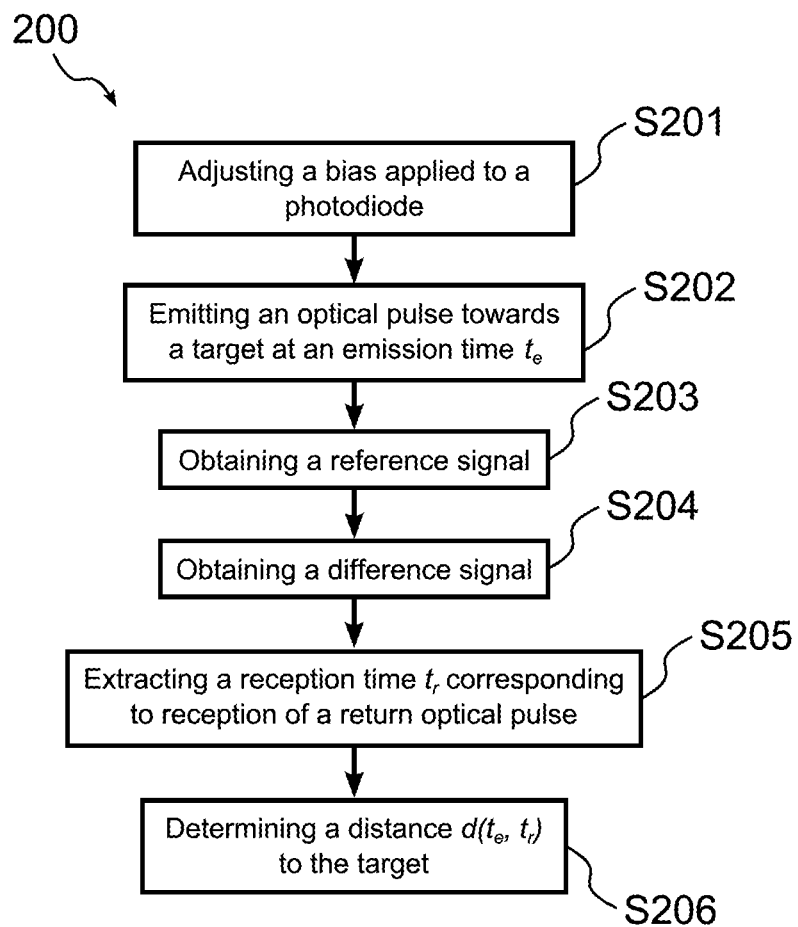
FIG. 2 is a flowchart of a method according to some embodiments.

With reference to FIG. 1, the signals involved when determining a distance to a target are schematically illustrated, and the obstacles that may arise when trying to achieve a high dynamic range are pointed out together with the solutions according to some embodiments of the present disclosure. Reference is also made to FIG. 2, which illustrate steps taken by a method according to some embodiments of the present disclosure, in order to determine a distance to a target.

FIG. 1 shows the different signals that arise when a distance is determined by measuring the time-of-flight of an emitted optical pulse that is emitted towards, and reflected at, a target (according to a method 200). At a time $t_1$, an optical pulse is emitted towards the target by an optical source. This is illustrated by the pulse 110a in the emission signal 101.

At a later time $t_2$, the optical pulse has had time to be reflected at the target and to return back to a photodiode that is arranged to receive the return optical pulse. The output signal 102 from the photodiode shows the detected optical pulse 120a. The detected optical pulse 120a is determined to have a low magnitude, and in order to increase the dynamic range of the instrument, the bias signal applied to the photodiode is adjusted (step S201) by quickly being ramped-up at a bias-adjusting time $t_3$, in order to make sure that the photodiode is ready to detect the next incoming return optical pulse at a later time with an increased amplification. The ramp-up 140 of the bias signal 104 will, however, generate a transient response or behavior from the photodetector. The transient behavior 130 is shown in the output signals 102.

A reference signal 103 indicative of the transient behavior of the photodiode is obtained (step S203). The reference signal 103 may be obtained from for example a reference electronic component that is arranged such that its signal output is unaffected by the return optical pulse and that is subjected to the same bias adjustment as the photodiode. Preferably, the reference electronic component has a transient behavior that is resembling, or equal to, that of the photodiode.

At a time $t_e=t_4$, preferably close to the detection time $t_2$ and the bias-adjusting time $t_3$, the next optical pulse is emitted (step S202), as indicated in the emission signal 101 as the pulse 110b. At this time, the bias-signal 104 is again constant with a finite value, but due to the short time that has elapsed since the bias was adjusted, the transient response has not yet vanished, and both the signals 102 and 103 from the photodiode and the reference electronic component respectively are still oscillating with a finite magnitude. This is still true at a later time $t_5$, when the emitted optical pulse is returned back to the photodiode. Without the transient response, the output signal 102 from the photodiode would have been the pulse 120b (drawn with a dashed line). However, due to the transient behavior the signal 102 now contains a superposition of both the transient behavior 130 and the pulse 120b, as is shown in the signal 102 by an oscillating pulse 120c. As the transient response is of the same magnitude as, or has an even larger magnitude than, the return optical pulse 120b, the return optical pulse may be difficult, or impossible, to detect.

In the figure, the emission time $t_e$ of the optical pulse occurs after the bias-adjusting time $t_3$. It is noted, however, that the optical pulse may be emitted also before, or concurrently with, the bias-adjusting time $t_3$.

According to the present disclosure, the signal 103 being unaffected by the return optical pulse and only containing the transient response 130 may be used to alleviate the aforementioned problem. As the transient behavior of the reference electronic component resembles, or is equal to, that of the photodiode, the transient response 130 in both signals 102 and 103 will be equal or substantially equal. If a difference signal 105 is obtained (step S204), for example by subtracting the signal 103 from the reference electronic component from the signal 102 from the photodiode, the difference signal 105 will show no or little signature of the transient response. The difference signal 105 includes both return optical pulses 150a (at $t_2$) and 150b (at $t_5$). As is shown in the difference signal 105, the transient response is cancelled, or at least significantly reduced, from the return optical pulse 150b (at $t_5$), and the return optical pulse 150b in the difference signal 105 may be advantageously used to determine the distance to the target. From the difference signal 105, a reception time $t_r=t_5$ may be extracted (step S205), and the distance d to the target may be determined based on this reception time $t_r$ and an emission time $t_e=t_4$ (step S206). If the optical pulse travels through air under normal circumstances, the distance d to the target from a geodetic instrument may for example be approximated as $d=(t_r-t_e)*c/2$, where c is the speed of light in vacuum. However, it will be appreciated that other parameters may be taken into account in order to calculate the distance.

Figure 3A:
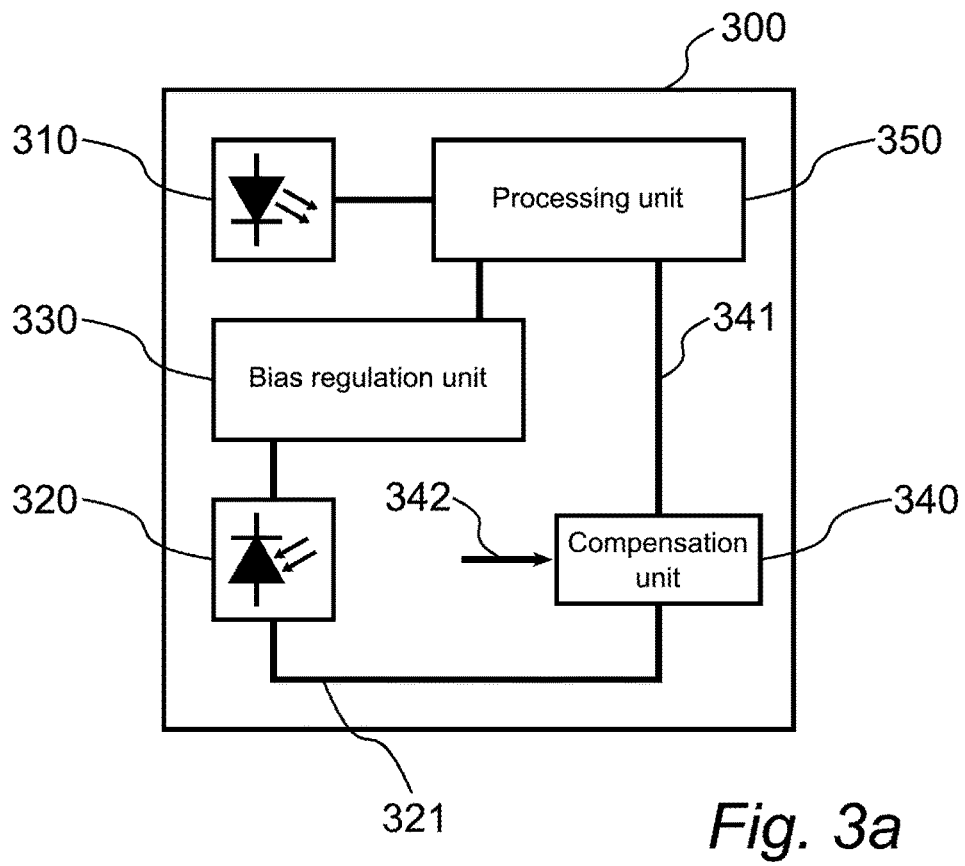
FIG. 3a, FIG. 3b and FIG. 3c are functional diagrams of a geodetic instrument according to some embodiments.

With reference to FIG. 3a, an embodiment of a geodetic instrument 300 will be explained in more detail. Other embodiments will be explained in more detail with reference to FIGS. 3b and 3c.

In FIG. 3a, the geodetic instrument may include an optical source 310 arranged to emit an optical pulse towards a target at an emission time $t_e$. The optical source 310 may be controlled by a processing unit 350. The processing unit 350 may be configured to decide when the optical source 310 is to emit an optical pulse, and e.g. which magnitude and/or phase the emitted optical pulse may have.

The processing unit 350 may be connected to the optical source 310 by e.g. electronic wiring, either directly or indirectly via other circuitry (not shown) suitable for controlling the optical source 310. The processing unit 350 may also be directly or indirectly connected to a bias regulation unit 330. The bias regulation unit 330 may supply a bias that is applied to a photodiode 320, and the bias regulation unit 330 may perform an adjustment of the bias applied to the photodiode 320. The photodiode 320 may be arranged to receive a return optical pulse that is reflected at a target.

The output signal 321 from the photodiode 320 may be fed into a compensation unit 340. The compensation unit 340 may be configured to obtain a difference signal 341 that corresponds to a difference between the signal 321 outputted from the photodiode 320 and a reference signal 342 that is indicative of the transient behavior of the photodiode 320 for a bias adjustment. After the difference signal 341 is obtained, the signal 341 may be fed back to the processing unit 350.

Based at least in part on the difference signal 341, in which a signature of the transient behavior of the photodiode for the bias adjustment has been reduced (and possibly eliminated), the processing unit 350 may be configured to extract a reception time $t_r$ that corresponds to the reception time of the return optical pulse. Based on the emission time $t_e$ and the reception time $t_r$, the processing unit 350 may then determine the distance to the target as outlined earlier.

Figure 3B:
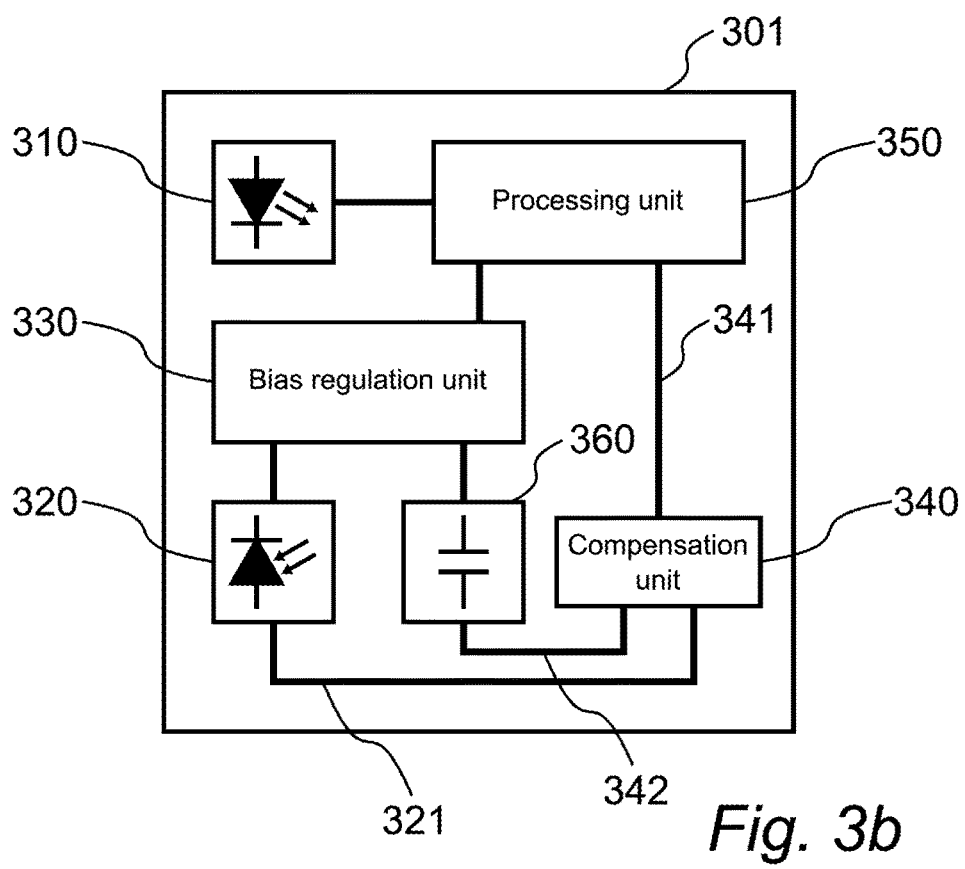

In FIG. 3b, another embodiment of a geodetic instrument 301 is schematically illustrated. The geodetic instrument 301 may be equivalent to the geodetic instrument 300 described with reference to FIG. 3a, except that it includes a reference electronic component 360. The reference electronic component 360 may be supplied with a bias from the bias regulation unit 330, and connected to the compensation unit 340 in order to provide a reference signal 342. The reference electronic component 360 may have a transient behavior that resembles, or is equal to, that of the photodiode 320 upon a bias adjustment by the bias regulation unit 330. The reference electronic component 360 may be arranged such that it is unaffected by the return optical pulse, i.e. its signal output is not affected by the return optical pulse.

For example, the reference electronic component 360 may be arranged at the inside of the geodetic instrument 301, such that it is shielded from light. The reference electronic component 360 may also be placed at the outside of the geodetic instrument 301 as long as it is shielded from the incoming return optical pulse in some way, e.g. by having a light-shielding cover or similar.

In some embodiments, the reference electronic component 360 may be another photodiode of the same kind as the photodiode 320. It may, however, be envisaged in some other embodiments that the reference electronic component 360 may be just a capacitor (or e.g. a solid state device that includes a capacitive element), with a capacitance that corresponds to (or matches) that of e.g. parasitic and/or internal capacitance of the photodiode 320. The transient behavior of the reference electronic component 360 may be such that its output signal 342 is indicative of the transient behavior of the photodiode 320, or such that its deviation therefrom is known when subject to the bias adjustment, such that the compensation unit 340 may compensate for the contribution of the transient behavior of the photodiode in the signal output from the photodiode, thereby providing the reference signal.

Figure 3C:
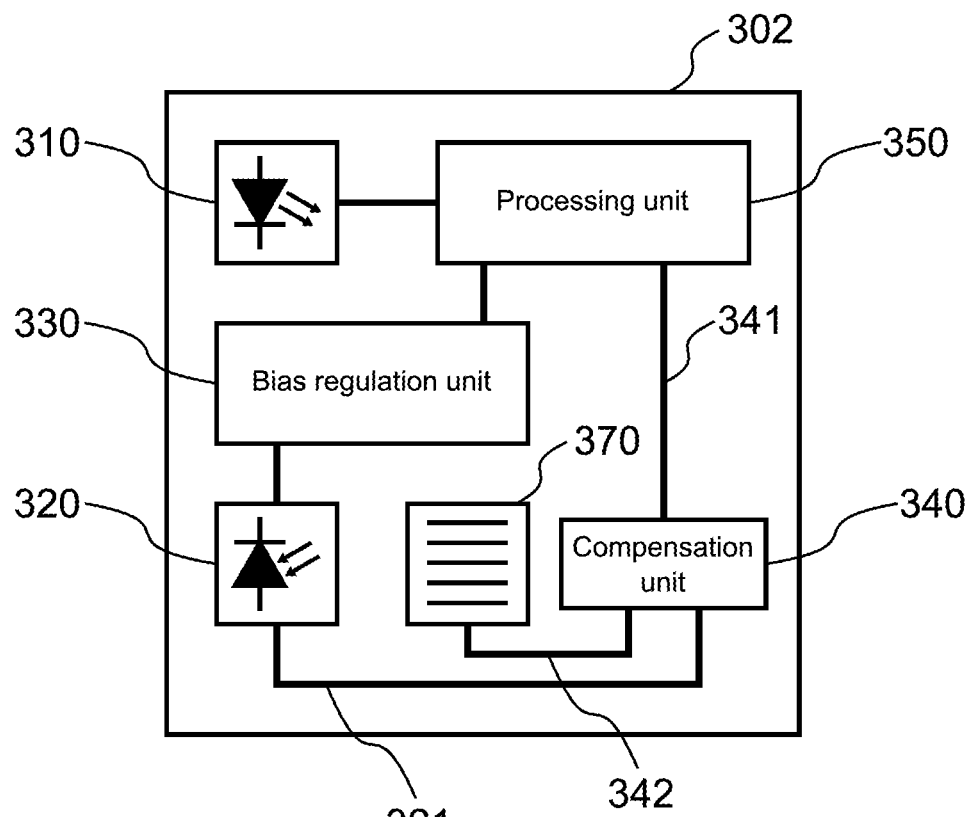

In FIG. 3c, a further embodiment of a geodetic instrument 302 is illustrated. The geodetic instrument 302 may be equivalent to the geodetic instruments 300 and 301 described with reference to FIGS. 3a and 3b, except in that it includes a memory 370 on which calibration data from a calibration of the photodiode 320 may be stored. The memory 370 may be arranged such that it may be accessed by the compensation unit 340. The calibration data may be used by the compensation unit 340 to obtain the difference signal 341. As an example, the photodiode 320 may go through a calibration process where it is subject to, in absence of a return optical pulse, a sequence of different bias adjustments. For each bias adjustment, the transient behavior of the photodiode 320 may be stored on the memory 370. This calibration procedure may be performed at the factory, but the instrument may be recalibrated by an operator later. The calibration procedure may also be performed by the instrument itself, in the field before, during, or after a measurement operation. The geodetic instrument 300 may then be operated to determine a distance to a target. With knowledge of how the transient behavior (as stored as calibration data on the memory 370) of the photodiode 320 depends on applied bias adjustment, the compensation unit may compensate for the transient behavior of the photodiode by e.g. using the stored calibration data as the reference signal 342.

Even though FIG. 3c only shows a memory 370, an additional embodiment may be envisaged, in which both a memory 370 with calibration data and a reference electronic component 360 are included, and in which embodiment the reference signal 342 may be obtained by using a combination of stored calibration data and the output from the reference electronic component 360.

Figure 4:
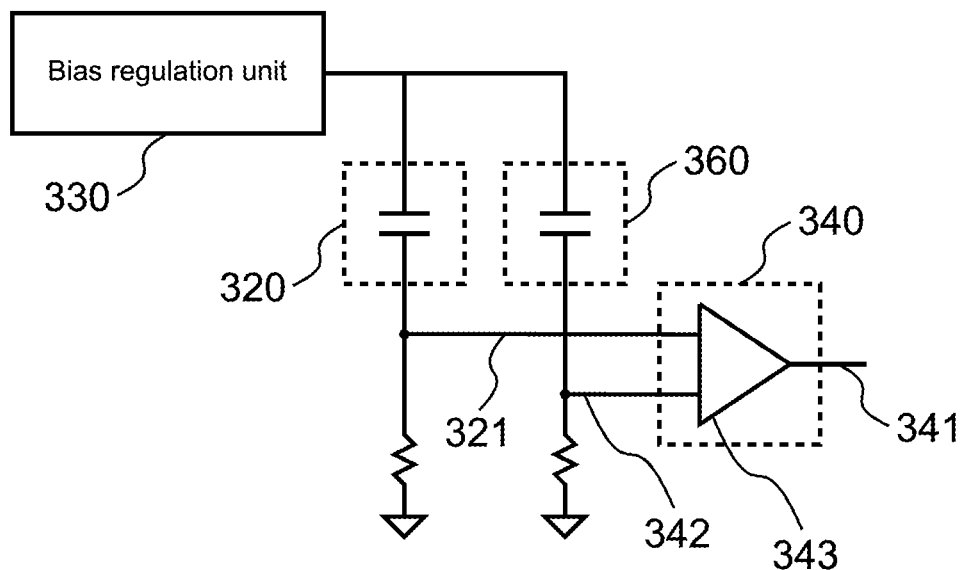
FIG. 4 illustrates an implementation of a transient behavior compensating circuit according to some embodiments.

With reference to FIG. 4, an exemplary circuit for transient behavior compensation will be described according to some embodiments.

In FIG. 4, a bias regulation unit 330 supplies a bias to a photodiode 320 and a reference electronic component 360. In the illustrated example, the same bias is supplied to both components. The reference electronic component 360 may be a second photodiode, or any other component (such as a capacitor) that has a resembling, or equal, capacitive dependence on the applied bias as the photodiode 320, as illustrated by the capacitor symbols. The output signal 321 from the photodiode 320 and the output signal (or reference signal) 342 from the reference electronic component 360 may be used as inputs to a compensation unit 340. The compensation unit 340 may for example include an operational amplifier 343 that is operated such that its output signal is proportional to a difference between the signals (such as the signals 321 and 342) inputted on its input terminals. Other electronic arrangements may also be considered, as long as a difference signal proportional to the difference between the signals 321 and 342 may be obtained, e.g. a transformer or other devices with common-mode signal-rejecting functionality. The output of the operational amplifier 343 (which is also the output of the compensation unit 340) is the difference signal 341 that may be used by a processing unit (not shown in FIG. 4) in order to extract the reception time of the return optical pulse.

A geodetic instrument 303 is described with reference to the schematic illustration shown in FIG. 5.

Figure 5:
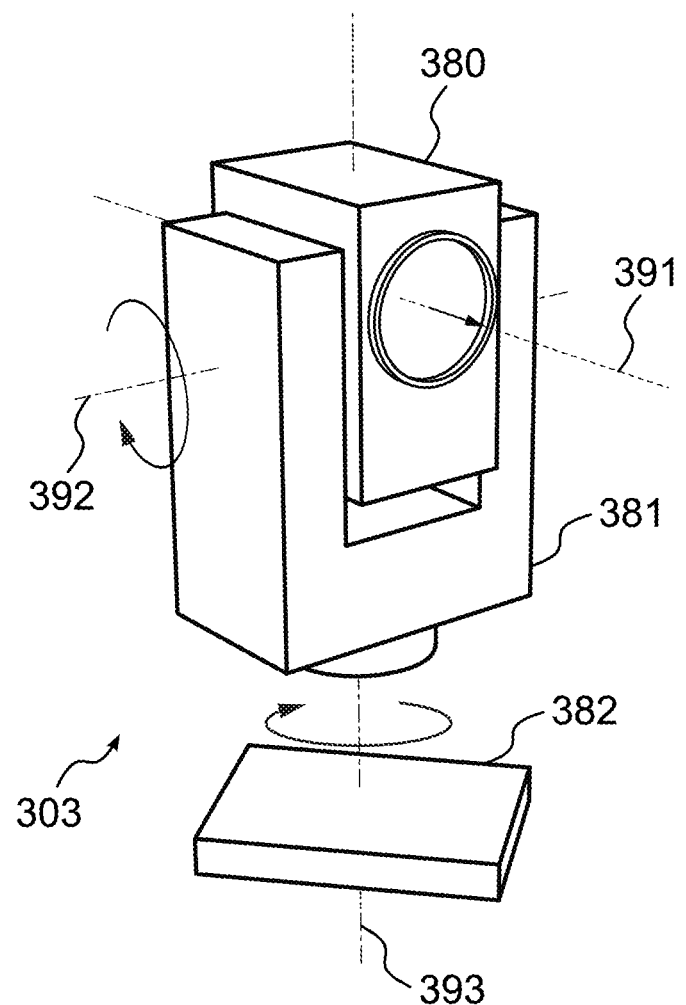
FIG. 5 illustrates a geodetic scanner according to some embodiments.

In FIG. 5, the geodetic instrument 303, which may be e.g. a total station or another instrument for surveying, includes a base 382, an alidade 381 and a center unit 380. The center unit 380 has an instrument optical axis or line of sight 391 for pointing towards a target. The center unit 380 may be mounted on the alidade 381 for rotation about a first (trunnion) axis 392. The alidade 381 may be mounted on the base 382 for rotation about a second (azimuthal) axis 393 orthogonal to and intersecting the first (trunnion) axis 392, such that the instrument optical axis 391 is rotatable about a rotation point (not shown in FIG. 5). The geodetic instrument 303 may further include all or some of the functional components described earlier with reference to FIGS. 3a-3c, such as for example the functional components illustrated as being included in the geodetic instrument 300 in FIG. 3a, the geodetic instrument 301 in FIG. 3b, the geodetic instrument 302 in FIG. 3c, or a combination thereof. The geodetic instrument 303 may initially rotate its instrument optical axis 391 such that it points towards a target (or, more specifically, towards a point or region on a target). Then, the geodetic instrument 303 may perform a method according to the present disclosure for determining a distance to the target. After the distance is determined, the geodetic instrument 303 may rotate its instrument optical axis 391 to point towards a next target (or a next point or region on the target), and a next distance may be determined. The direction (or angle) of the optical axis or line of sight 391 may be adjusted by rotating either one of the alidade 381 or the center unit 380 or by adjusting an optical component (such as a scanning mirror or other deflecting element, not shown) of the center unit 390 and/or by any combination thereof. The geodetic instrument 303 may for example continue to repeat such a procedure until e.g. a mapping of one or many targets has been performed.

Although the present invention has been described with reference to detailed examples, the detailed examples only serve to provide the skilled person with a better understanding, and are not intended to limit the scope of the invention. The scope of the invention is much rather defined by the appended claims.

Additionally, variations to the disclosed embodiments can be understood and effected by the skilled person in practicing the claimed invention, from study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method for determining a distance to a target by a geodetic instrument, the method comprising:
emitting an optical pulse towards a target at an emission time;
applying a bias adjustment to a photodiode arranged to receive a return optical pulse reflected at the target and generate an output signal, wherein applying the bias adjustment generates a transient behavior in the output signal;
obtaining a reference signal resembling, or being equal to, the transient behavior in the output signal;
obtaining a difference signal by subtracting, from the output signal from the photodiode, the reference signal;

extracting a reception time corresponding to reception of the return optical pulse at the photodiode based at least in part on the difference signal; and determining the distance to the target based on the emission time and the reception time.

2. The method of claim 1, wherein the reference signal is obtained from a reference electronic component arranged such that its signal output is unaffected by the return optical pulse and subject to a bias adjustment related to the bias adjustment applied to the photodiode.

3. The method of claim 2, wherein the reference electronic component has a transient behavior resembling, or equal to, that of the photodiode, or a transient behavior with a known deviation from that of the photodiode.

4. The method of claim 1, wherein the reference signal is obtained based on calibration data from a calibration of the photodiode.

5. The method of claim 1, wherein the bias adjustment is based at least in part on a signal level of a previously received return optical pulse.

6. The method of claim 1, wherein the bias adjustment is applied before, concurrently with or at least close to emission of the optical pulse towards the target and/or before the return optical pulse is received by the photodiode.

7. The method of claim 1, wherein the emission time is based at least in part on a previously extracted reception time.

8. The method of claim 1, wherein the reception time is extracted after a measurement time interval has elapsed after the emission time.

9. The method of claim 8, wherein the measurement time interval is based at least in part on the reception time.

10. A geodetic instrument, comprising:
an optical source arranged to emit an optical pulse towards a target at an emission time;
a photodiode arranged to receive a return optical pulse reflected at the target and generate an output signal;
a bias regulation unit configured to apply a bias adjustment to the photodiode, wherein applying the bias adjustment generates a transient behavior in the output signal;
a compensation unit configured to:
obtain a reference signal resembling, or being equal to, the transient behavior in the output signal; and
obtain a difference signal by subtracting, from the output signal from the photodiode, the reference signal; and
a processing unit configured to extract a reception time corresponding to reception of the return optical pulse based at least in part on the difference signal, wherein said processing unit is further configured to determine a distance to the target based on the emission time and the reception time.

11. The geodetic instrument of claim 10, further comprising a reference electronic component arranged such that its signal output is unaffected by the return optical pulse to output the reference signal, wherein the bias regulation unit is configured to perform another adjustment of a bias applied to the reference electronic component based on the bias adjustment for the photodiode.

12. The geodetic instrument of claim 11, wherein the reference electronic component has a transient behavior resembling, or equal to, that of the photodiode, or a transient behavior with a known deviation from that of the photodiode, wherein the reference electronic component has the same or similar capacitive dependency on applied bias as the photodiode, and/or wherein the reference electronic component comprises a photodiode, a capacitor, or a solid state device having a capacitive element.

13. The geodetic instrument of claim 11, wherein the reference electronic component is optically shielded from the return optical pulse.

14. The geodetic instrument of claim 10, further comprising a memory configured to store calibration data representative of the transient behavior of the photodiode for the bias adjustment to generate the reference signal.

15. The geodetic instrument of claim 10, wherein the bias regulation unit is further configured to perform the bias adjustment based at least in part on a signal level of a previously received return optical pulse.

16. The geodetic instrument of claim 10, wherein the photodiode is an avalanche photodiode.

17. The geodetic instrument of claim 10, wherein the bias regulation unit is further configured to adjust the bias of the photodiode in a linear mode.

18. The geodetic instrument of claim 10, wherein the compensation unit comprises a differential amplifier.

19. The geodetic instrument of claim 10, wherein the processing unit is configured to extract the reception time after a measurement time interval has elapsed since emission of the optical pulse.

20. The geodetic instrument of claim 10, wherein the bias regulation unit is configured to adjust the bias before, concurrently with or at least close to emission of the optical pulse towards the target, before the return optical pulse is received by the photodiode, and/or before emission of a next pulse based at least in part on the difference signal.

* * * * *